US007979156B2

(12) United States Patent
Ochi

(10) Patent No.: US 7,979,156 B2
(45) Date of Patent: Jul. 12, 2011

(54) AUTOMATIC VENDING MACHINE

(75) Inventor: Yasushi Ochi, Izumisano (JP)

(73) Assignee: BLD Oriental, Ltd., Izumisano-shi (JP)

( * ) Notice: Subject to any disclaimer, the term of this patent is extended or adjusted under 35 U.S.C. 154(b) by 0 days.

(21) Appl. No.: 12/875,232

(22) Filed: Sep. 3, 2010

(65) Prior Publication Data

US 2010/0332024 A1 Dec. 30, 2010

Related U.S. Application Data

(62) Division of application No. 11/815,655, filed as application No. PCT/JP2006/302025 on Feb. 7, 2006, now Pat. No. 7,885,724.

(30) Foreign Application Priority Data

Feb. 9, 2005 (JP) ................................ 2005-032489

(51) Int. Cl.
*G06F 17/00* (2006.01)

(52) U.S. Cl. ......................... 700/240; 700/232; 700/241

(58) Field of Classification Search .................. 700/232, 700/240, 241

See application file for complete search history.

(56) References Cited

U.S. PATENT DOCUMENTS

| | | | | |
|---|---|---|---|---|
| 6,059,142 | A * | 5/2000 | Wittern et al. | 700/238 |
| 6,189,944 | B1 | 2/2001 | Piche | |
| 6,206,166 | B1 * | 3/2001 | Picou | 194/241 |
| 6,656,091 | B1 * | 12/2003 | Abelbeck et al. | 482/9 |
| 6,752,088 | B2 | 6/2004 | Poarch et al. | |
| 2006/0049198 | A1 | 3/2006 | Guard | |

* cited by examiner

*Primary Examiner* — Timothy R Waggoner

(74) *Attorney, Agent, or Firm* — Westerman, Hattori, Daniels & Adrian, LLP

(57) ABSTRACT

An automatic vending machine (1) is provided with a vending machine main unit (10), with a play device (20) including a stuffed toy (21) on which a user can ride and a drive mechanism (24) for driving the stuffed toy (21), and with a control device that controls the vending machine main unit (10) and the drive mechanism (24) in the play device (20). The vending machine main unit (10) and the play device (20) are interconnected via the control device. The vending machine main unit (10) includes a product dispensing mechanism ((14*a* (14)), and payment accepting mechanisms ((13*a*), (13*b*) (13)) for accepting payment for the item, wherein the control device activates the product dispensing mechanism ((14*a* (14)) so as to deliver the item to the outside, as well as activates the drive mechanism (24) in the play device (20).

2 Claims, 13 Drawing Sheets

AUTOMATIC VENDING MACHINE

This application is a division of U.S. application Ser. No. 11/815,655, filed on Aug. 7, 2007 which is a national stage application under 35 U.S.C. 371 of International Application No. PCT/JP2006/302025 filed on Feb. 7, 2006 which is based upon and claims the benefit of priority from the prior Japanese Patent Application No. 2005-032489, filed on Feb. 9, 2005, the entire contents of which are incorporated herein by reference.

TECHNICAL FIELD

The present invention relates to automatic vending machines configured to accept payment equivalent to the value of products housed inside the machines, and discharge the products to the exterior.

BACKGROUND ART

Such automatic vending machines known to date include the example disclosed in Japanese Unexamined Pat. App. Pub. No. 2001-188730. The automatic vending machine in this instance is provided with: a product dispensing mechanism that discharges to the exterior products stocked into the machine beforehand; coin and bill slots (a payment accepting mechanism) through which monies are inserted; a touch panel for displaying various information and via which predetermined information is entered; and a control device for controlling operation of the product dispensing mechanism, and for displaying on the touch panel the various information and processing the information entered through the panel.

When the monies inserted through the coin and bill slots equal or exceed a fixed amount, the control device successively executes: a process of displaying a product selection screen on the panel; a process of recognizing, from the data entered by a purchaser viewing the product selection screen, which item has been selected, to permit the product dispensing mechanism to deliver a corresponding item to the exterior; a process, after the article has been delivered, of presenting, based on the various information displayed on the panel and based on the information entered through the panel, for example, a game resembling a slot machine in which designs are matched; and a process of, after the game ends, checking whether the designs have matched and if they have, once more displaying the product selection screen on the panel, and of recognizing from the information entered through the panel which item has been selected, to discharge the corresponding item to the exterior by means of the product dispensing mechanism.

The automatic vending machine thus configured is designed to create an increase in the number of users of the vending machine so as to lead to growth in sales, not merely by selling the items, but by allowing purchasers of the items to enjoy the design-matching game, and additionally providing an item as a giveaway at no charge when in the game a purchaser has matched up the designs.

Patent Document I: Japanese Unexamined Pat. App. Pub. No. H06-60256

DISCLOSURE OF INVENTION

Problem Invention is to Solve

With above conventional automatic vending machines, however, the games to be provided are so-called video games, which are, depending on what kind of games are provided, less-than-attractive for some purchasers (particularly females and little children) who are not interested in such games. That is to say, these games are likely to fail to encourage some purchasers, who have no interest in the games, to buy the items from the vending machines. Additionally, most games are commonplace, which also has been responsible for failure to attract purchasers' attention.

An object of the present invention, brought about in view of the circumstance described above, is to make available an automatic vending machine that offers services that have not existed to date, so as to draw purchasers' interest to lead to growth in product sales.

Means for Resolving the Problem

The present invention for resolving the problems involves an automatic vending machine having a vending machine main unit, a play device provided with a riding portion on which a person rides and with a drive mechanism that drives the riding portion, and a control means that controls the actuations of the vending machine main unit and play device, with the vending machine main unit and the play device being connected with each other via the control means, the automatic vending machine characterized in that the vending machine main unit is provided with a product dispensing mechanism that delivers an item previously stored interiorly to the outside and a payment accepting mechanism that accepts a payment for the item, the control means that checks whether or not the accepted payment is equal to a price of the item, from the payment accepted by the payment accepting mechanism, and when determining that the price has been paid, activates the product dispensing mechanism so as to deliver the item to the outside, as well as activate the drive mechanism.

According to the present invention, when the payment from a purchaser is accepted by the payment accepting mechanism in the vending machine main unit, the control means checks whether or not the payment accepted by the payment accepting mechanism is equal to the price of the item, first. Subsequently, the control means activates the product dispensing mechanism so that the items is delivered to the outside, as well as activates the drive mechanism in the play device, when determining that the price of the item has been paid.

It will be appreciated that in place of the play device, to the vending machine main unit may be connected: a massage device provided with a massage mechanism; a gas supply unit provided with a discharge mechanism for discharging a gas; an exercise device provided with a operational mechanism that allows people to exercise; an examination device provided with an assaying mechanism that assesses a person's condition; an indicator system provided with a display mechanism section that allows a person to look through a peephole at what is displayed; and an audio output device provided with an audio output mechanism section that plays a speech and sound for a person who is in a position where the speech and sound are heard.

Examples of the massage device include the one that massages purchaser's shoulders, neck, legs, back, and total body, examples of the gas supply unit include the one that discharges fragrance ingredient-containing air to allow the purchaser to smell it, and the one that discharges negative ion-containing air to allow the purchaser to take it in, examples of the exercise device include the one that gives the purchaser running and walking, examples of the examination device include the one that provides the purchaser with physical checkup (for example, blood pressure, pulse, weight and body fat percentage) and with mouth odor checkup, examples of the indicator system include the one that indicates a variety of images (information such as fortune telling, weather forecast, news relating to current events, stock, and currency exchange, scenery, animation, drama, movie, video game), the one that operates as appropriate a structure (such as a doll) to let the purchaser see it through the peephole, and the one that attempts purchaser's eyesight recovery and eyestrain relief by bringing away and closer (back and forth) an image and object that the purchaser see through the peephole to force purchaser's ciliary bodies that adjust a focus point depending on the distance to the image to repeat construction and relaxation, examples of the audio output device include the one that outputs a variety of speeches and sounds, such as music, from headphones provided in a position where the speeches and sounds are heard, speakers provided facing each other at an fixed interval from the ears of a person who is in the speech and sound hearing position, and speakers outputting directionally the speeches and sounds so as to be heard only by the person in the speech and sound hearing position.

Additionally, the play device, massage device, gas supply unit, exercise device, examination device, indicating system, and audio output device may be provided separately from, or integrally with, the vending machine main unit. Furthermore, which of the play device, massage device, gas supply unit, exercise device, examination device, indicating system and audio output device is connected to the vending machine main unit is preferably changed, depending on where the automatic vending machine is placed, or what kind of item is sold by the automatic vending machine.

As just described, if purchasers buy an item from the automatic vending machine, they can use the massage device, gas supply unit, exercise device, examination device, indicating system and audio output device, as a service for purchase of the item.

According to the automatic vending machine involving the present invention, making available to purchasers who have bought an item from the automatic vending machine the play device, massage device, gas supply unit, exercise device, examination device, indicating system and audio output device, which are nonexistent in conventional automatic vending machines, makes the automatic vending machine seem novel, compared with the conventional ones, to draw the interest of the purchasers so as to buy an items from the automatic vending machine to lead to growth in sales. Furthermore, the interest of a wide range of purchasers can be drawn, regardless of their age and gender, to plan to promote use of the automatic vending machine.

It should be understood that the payment accepting mechanism may be provided to the play device, massage device, gas supply unit, exercise device, examination device, indicating system and audio output device, not to the automatic vending machine. Although the payment accepting mechanism is usually disposed on the upper part of the automatic vending machine, such a payment accepting mechanism position is sometimes prohibitive of short children' use of the automatic vending machine. Thus, providing the payment accepting mechanism to the play device for little children, massage device, gas supply unit exercise device, examination device, indicating system and audio output device lowers the position where the payment accepting mechanism is disposed, making the automatic vending machine usable for the little children.

Effects of the Invention

As described above, according to the automatic vending machine involving the present invention, connecting the vending machine main unit to the play device, massage device, gas supply unit, exercise device, examination device, indicating system and audio output unit makes the automatic vending machine seem novel, compared with the conventional automatic vending machines having video game function, and draws the interest of a wide range of purchasers to lead to growth in sales of the item. Moreover, if the payment accepting mechanism is provided to the play device, massage device, gas supply unit, exercise device, examination device, indicating system and audio output device, the automatic vending machine can be made more usable for little children.

LEGEND

1: play device; 10: vending machine main unit; 10*a*: feet; 11: display compartment; 12: item selecting mechanism; 12*a*:

item selecting buttons; 12*b*: selected product detection unit; 13: payment accepting mechanism; 13*a*: coin slot; 13*b*: bill slot; 13*c*: amount credited detection unit; 14: product dispensing mechanism: 14*a*: open compartment; 17: control means; 18: device selecting mechanism; 18*a*: device selecting buttons; 18*b*: selected device detection unit; 18: door; 20: play device; 21: stuffed toy; 22: figure part; 23: attachment part; 24: drive mechanism: 25: base board; 26: moving board

BEST MODE FOR CARRYING OUT THE INVENTION

Figure 1:
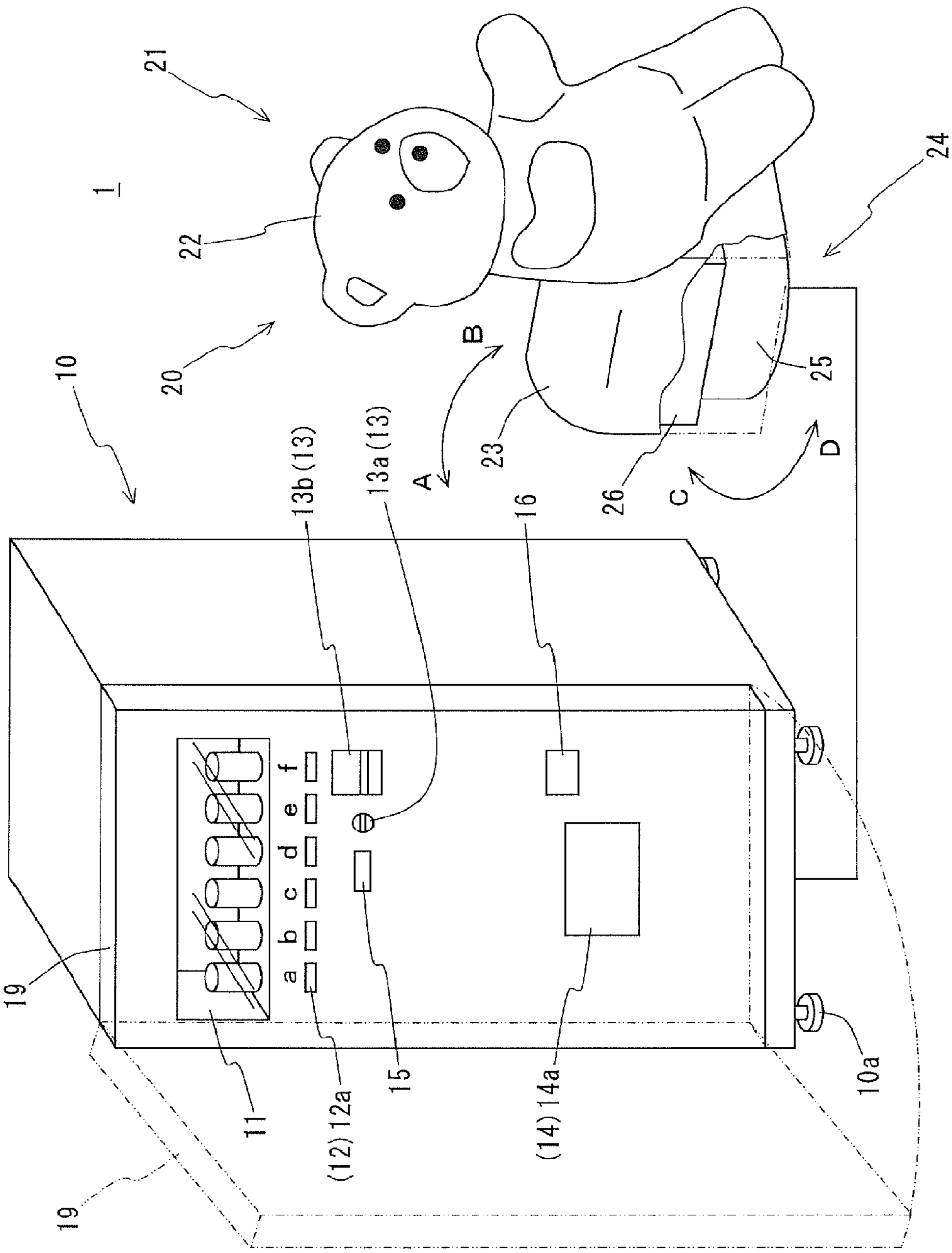
FIG. 1 is a perspective view illustrating an outlined configuration of an automatic vending machine involving a first embodiment of the present invention.

A specified embodiment of the present invention is explained hereinafter with reference to the accompanying drawings. FIG. 1 is a perspective view illustrating an outlined configuration of an automatic vending machine involving a first embodiment of the present invention, and FIG. 2 is a block diagram of the automatic vending machine illustrated in FIG. 1.

Figure 2:
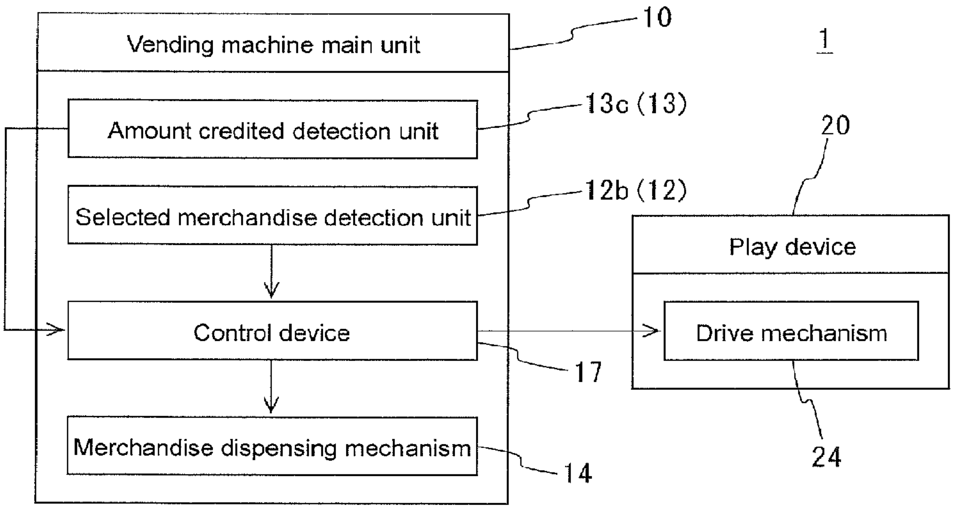
FIG. 2 is a block diagram representing the automatic vending machine illustrated in FIG. 1.

As illustrated in FIG. 1 and FIG. 2, an automatic vending machine 1 of this embodiment is configured with a vending machine main unit 10, a play device 20, and a control means 17 built into the vending machine main unit 10 to control actuations of the automatic vending machine 10 and play device 20, and is placed in, for example, a playroom in a department stores and a supermarket.

The vending machine main unit 10 is provided with, in addition to the control means 17, a display compartment 11 formed in upper part on the front face of the automatic vending machine 10, and in which a plurality of commercial samples of items that are preciously stocked interiorly is displayed, with an item selecting mechanism 12 for allowing selection of a desired item from those displayed in the display compartment 11, with a payment accepting mechanism 13 for accepting the payment for each of the items, and with a product dispensing mechanism 14 that delivers to the outside the items previously stocked interiorly, and feet 10*a* are installed to the four corners of the under face of the vending machine main unit 10. It is assumed that all the items are determined at the same price.

The item selecting mechanism 12 is configured with a plurality of item selecting buttons 12*a* provided below the display compartment 11 in a one-to-one correspondence with the items displayed in the display compartment 11, and a selected product detection unit 12*b* that detects which of the item selecting buttons 12*a* has been pushed, and sends to the control means 17 data on that of the item selecting buttons 12*a* having been pushed. The payment accepting mechanism 13 is configured with a coin slot 13*a* and bill slot 13*b* that are provided below the item selecting buttons 12*a*, and into which coins and bills are inserted, and with an amount credited detection unit 13*c* that detects the amount of the coins and bills inserted from the coin slot 13*a* and bill slot 13*b* to send to the control means 17 data on the detected amount. The product dispensing mechanism 14, which is provided with an open compartment 14*a* that is formed in a lower part on the front of the vending machine main unit 10, and out of which the items are taken, and with the product dispensing mechanism 14, is configured to deliver the items to this open compartment 14*a*.

Furthermore, in the vending machine main unit 10, a display 15 that is provided below the item selecting buttons 12*a*, and on which the total amount of the bills and coins inserted from the coin slot 13*a* and bill slot 13*b* is indicated, a coin return compartment 16 that is provided in lower part on the front face of the vending machine main unit 10, and out of which change is taken, and a door 19 that pivots horizontally to open outwards, and that an operator opens mainly when putting the items inside the vending machine main unit 10 are formed.

The control means 17 starts a series of the following processes, when the data on the amount of money is sent from the amount credited detection unit 13*c*—that is, when coins are dropped into the coin slot 13*a*, or when bills are inserted into the bill slot 13*b*.

Specifically, the control means 17 is configured to successively execute a first process of calculating, based on the money amount-related data sent from the amount credited detection unit 13*c*, the total amount of the coins and bills inserted from the coin slot 13*a* and bill slot 13*b* to indicate the calculated total amount on the display 15, as well as check whether or not the calculated total amount equals or exceeds a fixed amount (price of the items), a second process of, when the calculated amount is determined to do so, recognizing from the data, sent from the selected product detection unit 12*b*, involving the item selecting buttons 12*a*, which of the items has been selected (which of the items is to be delivered), to allow the product dispensing mechanism 14 to deliver the corresponding item into the open compartment 14*a*, as well as compute a change, based on the calculated total amount and a price of the corresponding item, to deliver the change, if it is actually computed, into the coin return compartment 16, and a third process of activating the play device 20 for a fixed period of time.

The play device 20 is configured with a stuffed toy 21 on which a purchaser rides, and a drive mechanism 24 that drives the stuffed toy 21.

The drive mechanism 24 is configured with a base board 25, and a moving board 26 connected to the base board 25 to perform a rocking operation along the arrow A-B (back and forth) and a rotating operation along the arrow C-D (the direction of horizontal rotation) on an (not-illustrated) actuator, whose actuation is controlled by the control means 17. On the other hand, the stuffed toy 21 is configured with a figure part 22 modeled on an animal, and a sack-like attachment part 23 connected to the figure part 22 and attached to the drive mechanism 24 to cover it.

With this play device 20, a purchaser can straddle the stuffed toy 21 that rocks along the arrow A-B and rotates along the arrow C-D to enjoy an amusement in which the sensation of riding on an animal is experienced.

According to the automatic vending machine as described above in this embodiment, if coins and bills (money) are inserted by a purchaser into the coin slot 13*a* and bill slot 13*b*, how much coins and bills are inserted is detected by the amount credited detection unit 13*c*, and the data involving the detected amount of money is sent from the amount credited detection unit 13*c* to the control means 17.

In the control means 17, the total amount of the inserted coins and bills is calculated, based on the received data involving the amount of money, and the calculated total amount of money is indicated on the display 15, as well as whether or not the calculated total amount of money equals or exceeds a fixed amount (the price of the items) is checked.

If the calculated total amount of money equals or exceeds the fixed amount, which of the item selecting buttons 12*a* has been pushed is detected by the selected product detection unit 12*b* after a purchaser pushes that of the item selecting buttons 12*a* corresponding to a desired item, and the data involving that of the item selecting buttons 12*a* having been detected is sent to the control means 17. Then, which of the items has been selected (an item to be delivered) is recognized by the control means 17, based on the received data involving the item selecting buttons 12*a*, and the corresponding item is delivered into the open compartment 14*a* by the item dispensing mechanism 14.

After that, the purchaser takes the item out of the open compartment 14*a* to get the item. Additionally, because the drive mechanism 24 for the play device 20 is driven by the control means 17 for a fixed period of time, the purchaser can play straddling the stuffed toy 21 rocking along the arrow A-B and rotating along the arrow C-D.

As just described, because the play device 20, which has been nonexistent in conventional automatic vending machines, is made available to purchasers who buy items from the automatic vending machine 1, the automatic vending machine 1 appears novel, compared with the conventional automatic vending machines. Therefore, the automatic vending machine 1 of this embodiment interests the purchasers so as to buy the items from the automatic vending machine 1 to lead to growth in sales of the items. Furthermore, the interest of little children and parents with them is drawn more strongly, so that promoting use of the automatic vending machine 1 can be attempted.

While one embodiment of the present invention has been explained in the foregoing, specific modes by which the present invention can be adopted are not in any way limited to the above example.

Figure 3:
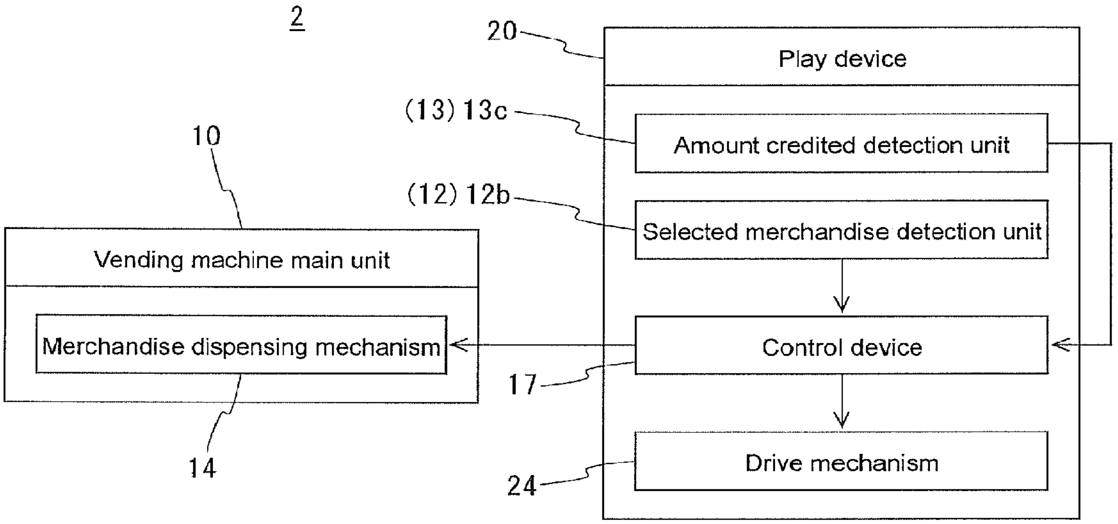
FIG. 3 is a block diagram representing an outlined configuration of the automatic vending machine involving a second embodiment.
Figure 4:
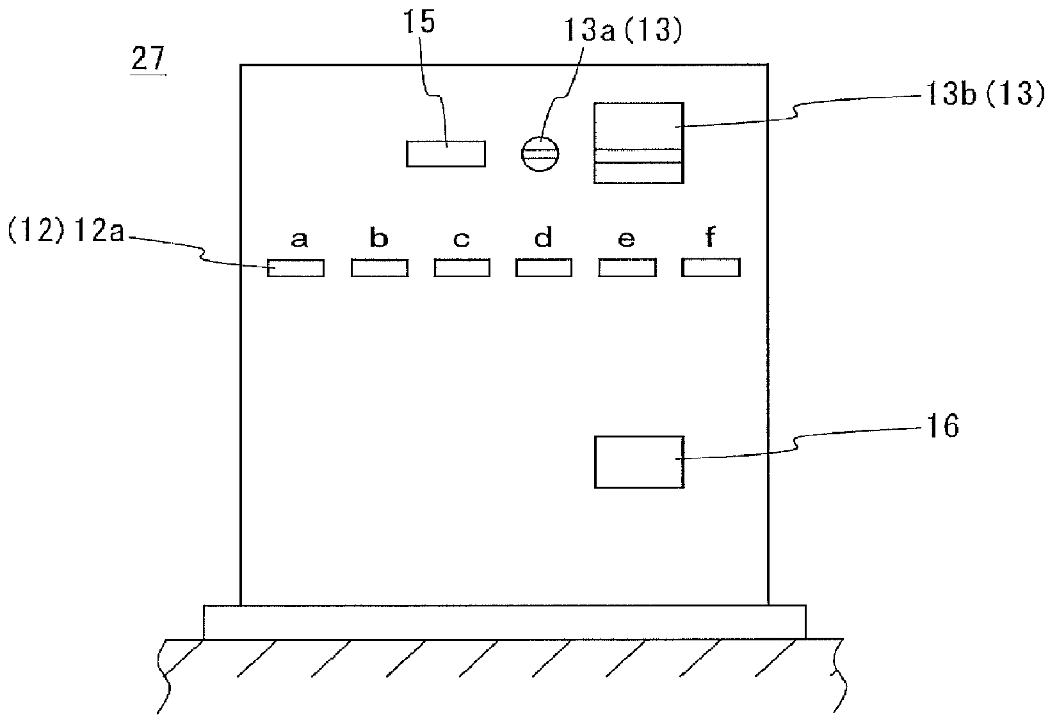
FIG. 4 is a front view illustrating an outlined configuration of a control panel involving a third embodiment.
Figure 5:
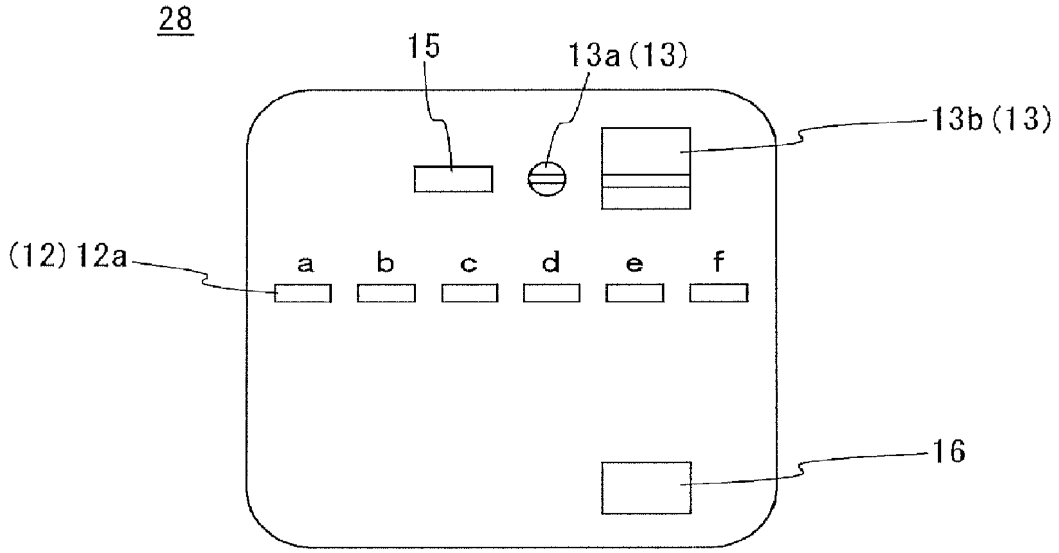
FIG. 5 is a front view illustrating an outlined configuration of the control panel involving a fourth embodiment.

Although the item selecting mechanism 12, payment accepting mechanism 13, display 15, coin return compartment 16 and control means 17 are provided to the vending machine main unit 10 in above example, to which they are provided is not limited to the vending machine main unit 10, so they may be provided to the play device 20 to configure an automatic vending machine 2, as illustrated in FIG. 3 through FIG. 5. Furthermore, FIG. 3 is a block diagram representing an outlined configuration of the automatic vending machine involving a second embodiment, FIG. 4 is a front view illustrating an outlined configuration of a control panel involving the second embodiment, and FIG. 5 is a front view illustrating an outlined configuration of the control panel involving the second embodiment.

In such a configuration, the play device 20 is provided with a control panel 27 as illustrated in FIG. 4, disposed near the play device 20, and including the item selecting mechanism 12, payment accepting mechanism 13, display 15, coin return compartment 16 and control means 17, or with a control panel 28 as illustrated in FIG. 5, mounted to the stuffed toy 21, and including the item selecting mechanism 12, payment accepting mechanism 13, display 15, coin return compartment 16 and control means 17.

And, the control panels 27, 28 are provided with the coin slot 13*a* and bill slot 13*b* of the payment accepting mechanism 13, and the display 15 in upper part of the control panels 27, 28, with the plurality of item selecting buttons 12*a* below the coin slot 13*a*, bill slot 13*b* and display 15, and with the coin return compartment 16 in lower part of the control panels 27, 28.

The height of the control panel 27 is shortened in accordance with the height of little children so that even little children can effortlessly insert coins and bills into the coin slot 13*a* and bill slot 13*b*, and push the item selecting buttons 12*a*. Additionally, the control panel 28 is adjusted in level at where it is mounted to the stuffed toy 21 so that little children can effortlessly insert coins and bills into the coin slot 13*a* and bill slot 13*b*, and push the item selecting buttons 12*a*, before mounted to the stuffed toy 21.

The automatic vending machine 2 configured in this manner brings not only the advantage as above but also the following another advantage. That is to say, although in the vending machine main unit 10 as illustrate in FIG. 1 and FIG. 2, the coin slot 13*a*, bill slot 13*b* and item selecting buttons 12*a* are provided in a position in the upper part of the vending machine main unit 10, such a position is sometimes too high for short children to insert coins and bills and to push the item selecting buttons 12*a*. Providing the item selecting mechanism 12, payment accepting mechanism 13, display 15 and coin return compartment 16 to the play device 20, however, lowers the positions of the coin slot 13*a*, bill slot 13*b* and item selecting buttons 12*a*, compared with their positions in the vending machine main unit 10, making the automatic vending machine 2 more usable for the little children.

Furthermore, the control means 17 may be provided to the vending machine main unit 10, with the item selecting mechanism 12, payment accepting mechanism 13, display 15 and coin return compartment 16 provided to the play device 20, or the item selecting mechanism 12, payment accepting mechanism 13, display 15 and coin return compartment 16 may be provided to the vending machine main unit 10, with the control means 17 provided to the play device 20, though such configurations are not illustrated in particular.

Figure 6:
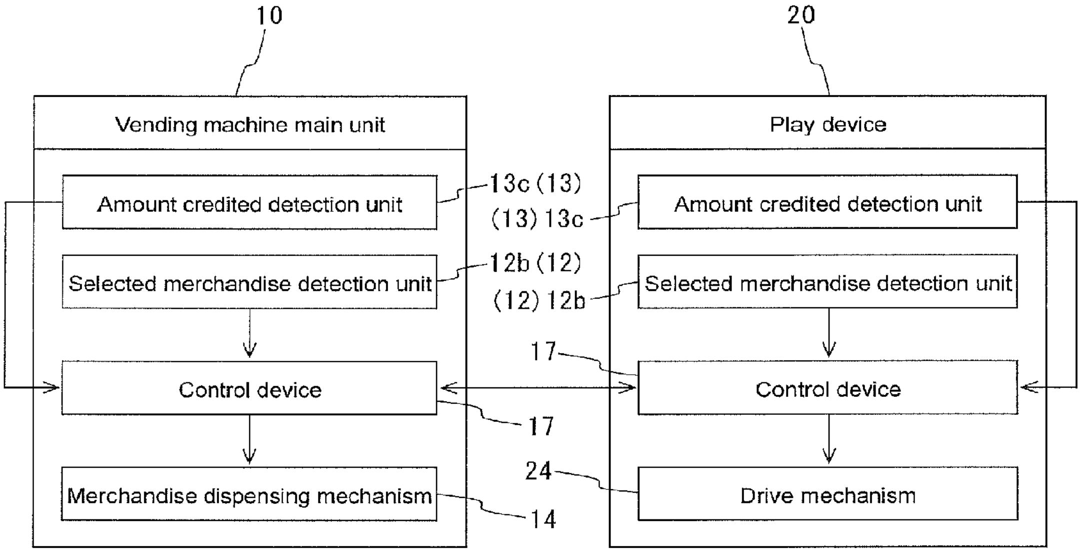
FIG. 6 is a block diagram representing an outlined configuration of the automatic vending machine involving a fifth embodiment.

Moreover, as illustrated in FIG. 6, the item selecting mechanism 12, payment accepting mechanism 13, display 15, coin return compartment 16 and control means 17 can be provided to both the vending machine main unit 10 and play device 20. In such a configuration, in either of vending machine main unit 10 and play device 20, coins and bills can be inserted into the coin slot 13*a* and bill slot 13*b*, and the item selecting buttons 12*a* can be pushed. Therefore, it is made possible to have adults use the coin slot 13*a*, bill slot 13*b* and item selecting buttons 12*a* in the vending machine main unit 10, and children can use them in the play device 20, so that usability of the automatic vending machine is improved.

Figure 7:
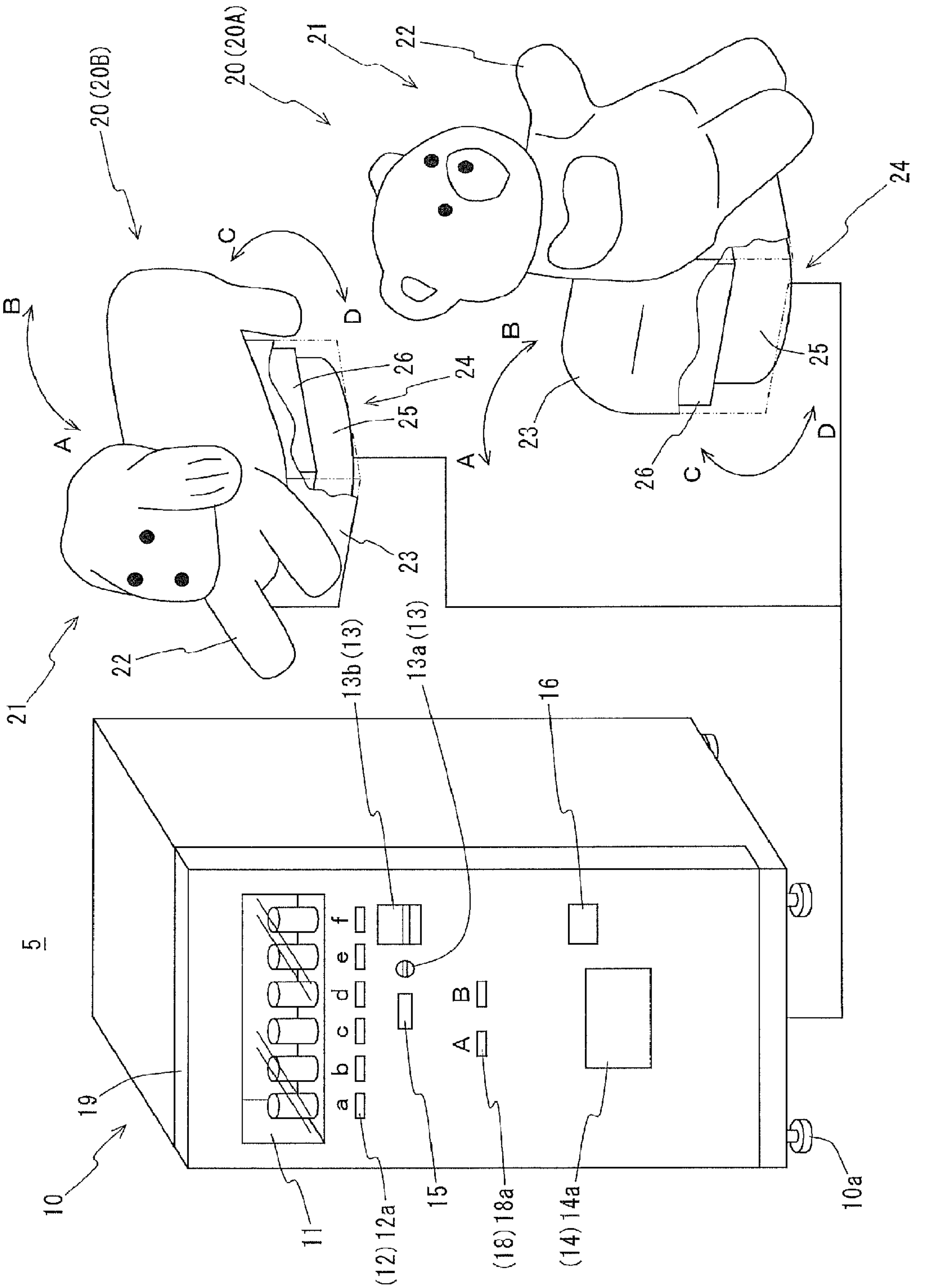
FIG. 7 is a perspective view illustrating an outlined configuration of the automatic vending machine involving a sixth embodiment.
Figure 8:
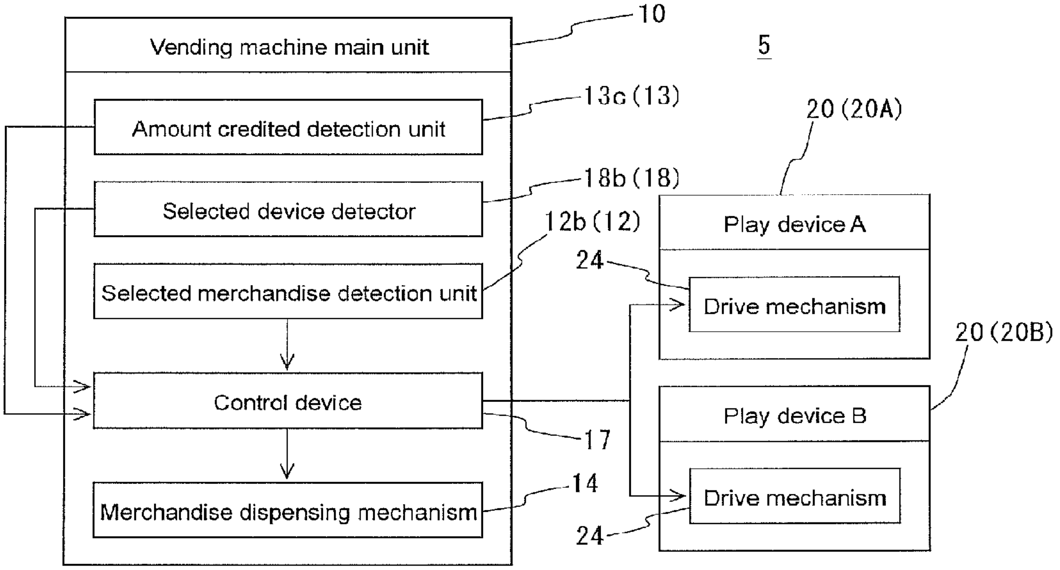
FIG. 8 is a block diagram representing the automatic vending machine illustrated in FIG. 7.

Furthermore, as illustrate in FIG. 7 and FIG. 8, a plurality of play devices 20 (two play devices 20A, 20B in the illustrated example) can be connected to the vending machine main unit 10 to configure an automatic vending machine 5. It is to be noted that the play devices 20 are configured so that the stuffed toys 21 have different figures, and the rest is same. Furthermore, FIG. 7 is a perspective view illustrating an outlined configuration of the automatic vending machine involving the second embodiment of the preset invention, and FIG. 8 is a block diagram representing the automatic vending machine illustrated in FIG. 7.

In such a configuration, the vending machine main unit 10 is further provided with a device selecting mechanism 18 for selecting which of the play devices 20 is activated, and the device selecting mechanism 18 is configured with device selecting buttons 18*a* provided below the coin slot 13*a*, bill slot 13*b* and display 15 in one-to-one correspondence with the play devices 20, and a selected device detection unit 18*b* that detects which of the device selecting buttons 18*a* has been pushed and sends to the control means 17 data involving that of the device selecting buttons 18*a* having been detected.

In order to execute the third process, the control means 17 recognizes that of the play devices 20 having been selected (that of the play devices 20 to be activated), based on data sent from the selected device detection unit 18*b*, and involving the device selecting buttons 18*a*, to activate for a fixed period of time the drive mechanism 24 for that of the play devices 20 selected.

According to the automatic vending machine 5 in this configuration, after a purchaser pushes the item selecting buttons 12*a*, and the corresponding item is delivered to the open compartment 14*a* by the product dispensing mechanism 14, the purchaser pushes that of the device selecting buttons 18*a* representing that of the play devices on which the purchaser wants to ride, and then which of the device selecting buttons 18*a* has been pushed is detected by the selected device detection unit 18*b*, and the data involving that of the device selecting buttons 18*a* having been detected is sent to the control means 17. Subsequently, in the control means 17, that of the play devices 20 having been selected is recognized, based on the received data involving the device selecting buttons 18*a*, and the selected play device 20 is activated for the fixed period of time.

Consequently, if the automatic vending machine 5 is configured as just described, purchasers can select a desired one from the plurality of the play devices 20 to activate it, so that the automatic vending machine 5 can be made more suitable to the purchasers' various tastes and likings to draw their interest.

Figure 9:
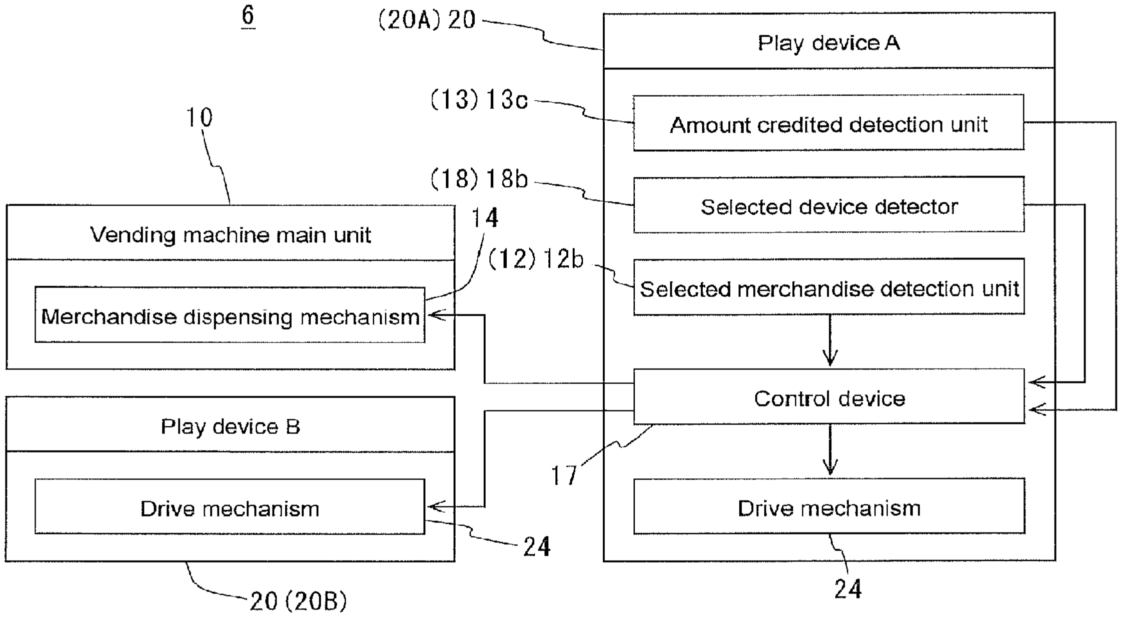
FIG. 9 is a block diagram representing an outlined configuration of the automatic vending machine involving a seventh embodiment.

Moreover, also in such an automatic vending machine 5, as in the automatic vending machine 2, the item selecting mechanism 12, payment accepting mechanism 13, display 15, coin return compartment 16, control means 17 and device selecting mechanism 18 are provided to either of the play devices 20 (to the play device 20A in the illustrated example) to configure an automatic vending machine 6, as illustrated in FIG. 9. In addition, although not illustrated particularly, the item selecting mechanism 12, payment accepting mechanism 13, display 15, coin return compartment 16, control means 17 and device selecting mechanism 18 are provided to the control panel 27 as illustrated in FIG. 4, or to the control panel 28 as illustrated in FIG. 5. Furthermore, FIG. 9 is a block diagram representing an outlined configuration of the automatic vending machine involving the second embodiment of the present invention.

Figure 10:
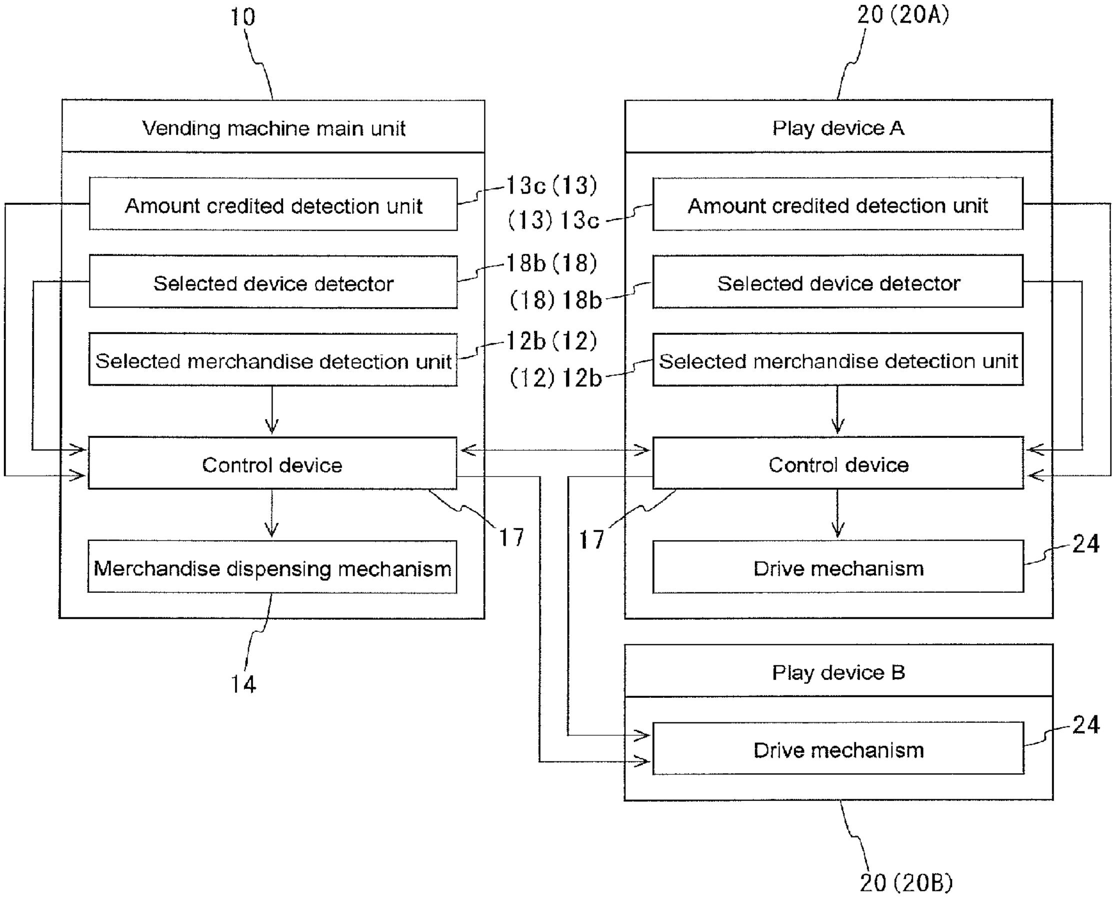
FIG. 10 is a block diagram representing an outlined configuration of the automatic vending machine involving an eighth embodiment.

Furthermore, although not illustrated in particular, the control means 17 may be provided to the vending machine main unit 10, with the item selecting mechanism 12, payment accepting mechanism 13, display 15, coin return compartment 16 and device selecting mechanism 18 provided to either of the play devices 20, and additionally, the item selecting mechanism 12, payment accepting mechanism 13, display 15, coin return compartment 16, and device selecting mechanism 18 may be provided to the vending machine main unit 10, with the control means 17 provided to either of the play devices 20. Also as illustrated in FIG. 10, the item selecting mechanism 12, payment accepting mechanism 13, display 15, coin return compartment 16, control means 17 and device selecting mechanism 18 can be provided to both the vending machine main unit 10 and either of the play devices 20.

Also feasible is a configuration in which the item selecting mechanism 12, payment accepting mechanism 13, display 15, coin return compartment 16, control means 17 and device selecting mechanism 18 are provided to both the play devices 20, not to only the play device 20A.

Figure 11:
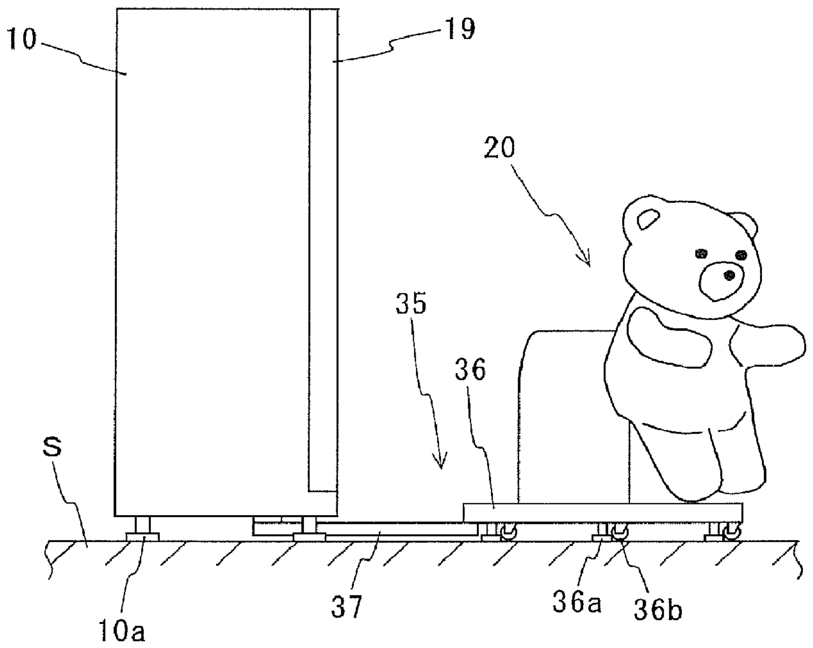
FIG. 11 is a side view illustrating an outlined configuration of a connecting mechanism.
Figure 12:
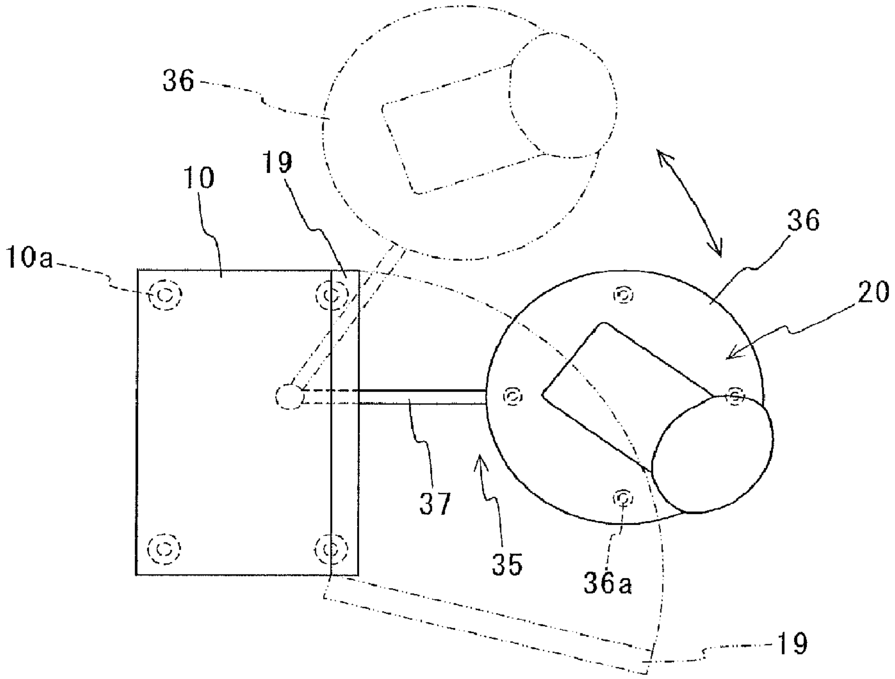
FIG. 12 is a plan view illustrating the connecting mechanism in FIG. 11.

Furthermore, the vending machine main unit 10 and play device 20 may be connected with each other by a connecting mechanism 35, which is configured, as illustrated in FIG. 11 and FIG. 12, with an installation board 36, to the under face of which four feet 36*a* and castors 36*b* are provided, and on the top face of which the play device 20 is placed and anchored, and with a connecting member 37, first end of which is inserted into a space defined by the feet 10*a* of the vending machine main unit 10 between the vending machine main unit 10 and an installation surface S to be mounted to the under face of the vending machine main unit 10 so as to freely swing along the arrow, and a second end of which is affixed to the installation board 36.

The installation board 36 is formed so that its top face is lower than the under face of the door 19 of the vending machine main unit 10, and usually is placed in front of the vending machine main unit 10. Furthermore, the vertical length of the feet 36*a* is adjustable, and is usually adjusted so that the castors 36*b* are floated.

Moreover, the installation board 36 is configured to be retracted into a position opposite to an orientation in which, and out of a moving path in which, the door 19 opens, by pivoting the casters 36*b* about the first end of the connecting member 37 after the length of the feet 36*a* is adjusted so that the castors 36*b* abut on the installation surface S.

In order to connect the vending machine main unit 10 and the play device 20 with each other, however, if they are connected by, for example, placing them separately to connect them just with a connecting cable, there is a risk that the connecting cable is cut, and the play device 20 (a device connected to the vending machine main unit 10) is stolen.

Therefore, mounting the play device 20 via the connecting mechanism 35 to the vending machine main unit 10 eliminates such a problem effectively.

It should be understood that a first end of the connecting member 37, which is not necessarily mounted to the under face of the vending machine main unit 10 so as to freely swing, may be affixed not to pivot. In this case, however, the installation board 36 needs to be placed at the retracting position.

Figure 13:
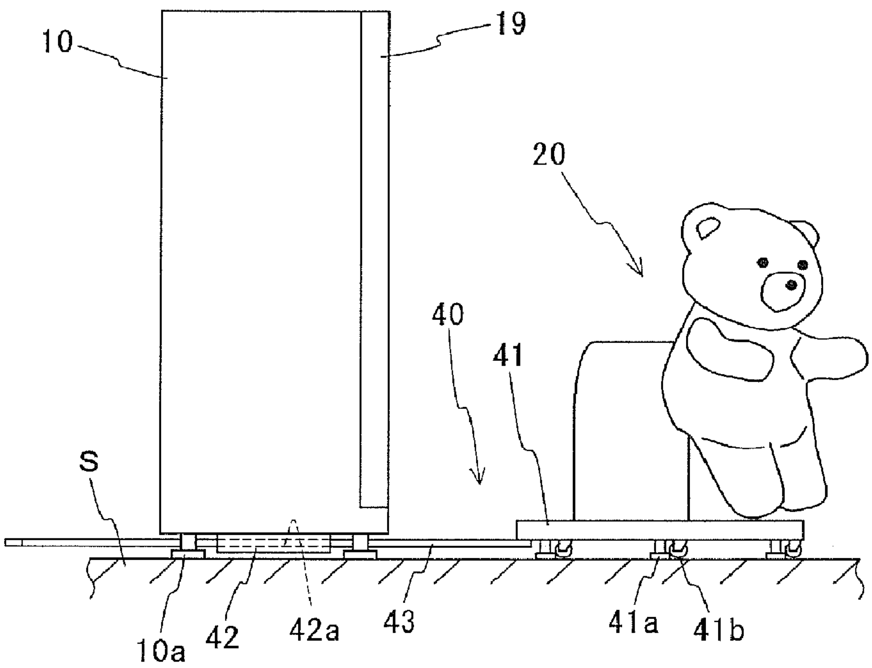
FIG. 13 is a side view illustrating an outlined configuration of the connecting mechanism.
Figure 14:
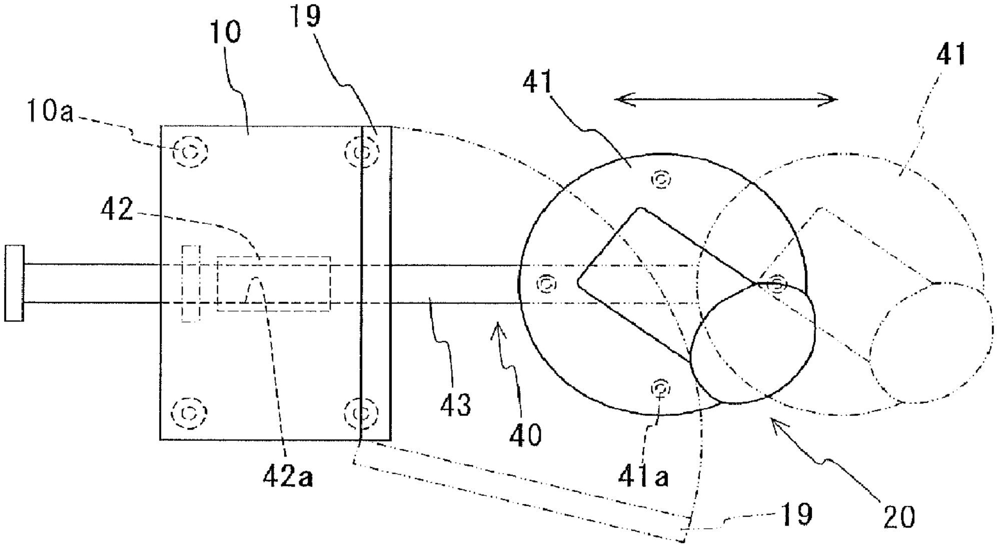
FIG. 14 is a plan view illustrating the connecting mechanism in FIG. 13.

Furthermore, the connecting mechanism 35 may be configured as a connecting mechanism 40 as illustrated in FIG. 13 and FIG. 14. The connecting mechanism 40 is configured with an installation board 41, on under face of which four feet 41*a* and castors 41*b* are provided, and on top face of which the play device 20 is placed and anchored, with an engaging member 42 having an engaging hole 42*a* passing through the engaging member 42 from the front of, to the back of, the vending machine main unit 10, and affixed to the under face of the vending machine main unit 10, and with a guide member 43 engaged to the engaging hole 42*a* of the engaging member 42 movably along the arrow, and a first end of which is affixed to the installation board 41.

The installation board 41 is formed so that its top face is lower than the under face of the door 19, and is placed in the front of the vending machine main unit 10. Furthermore, the feet 41*a* are configured to be adjustable in vertical lengths, and are usually adjusted so that the casters 41*b* are floated.

Additionally, the installation board 41 is configured to be guided by the engaging member 42 and guide member 43 due to their engaging relationship so as to move along the arrow to retract to a position out of a moving path in which the door 19 opens, after the lengths of the feet 41*a* are adjusted so that the castors 41*b* abut on the installation surface S. Therefore, such a configuration of the connecting mechanism 40 brings the same advantage as described above.

Figure 15:
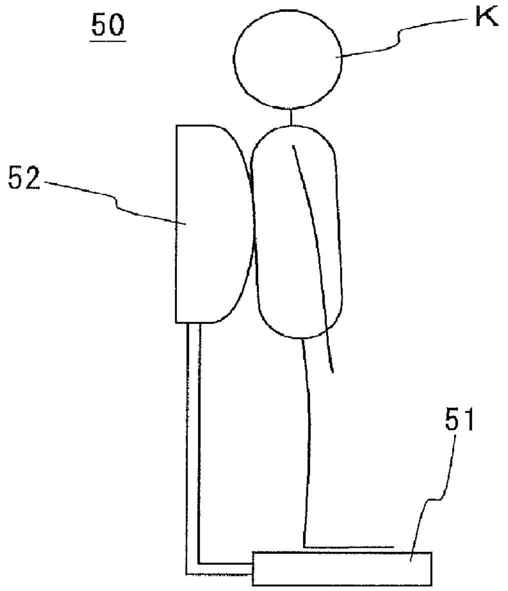
FIG. 15 is a side view illustrating an example of a massage device.
Figure 16:
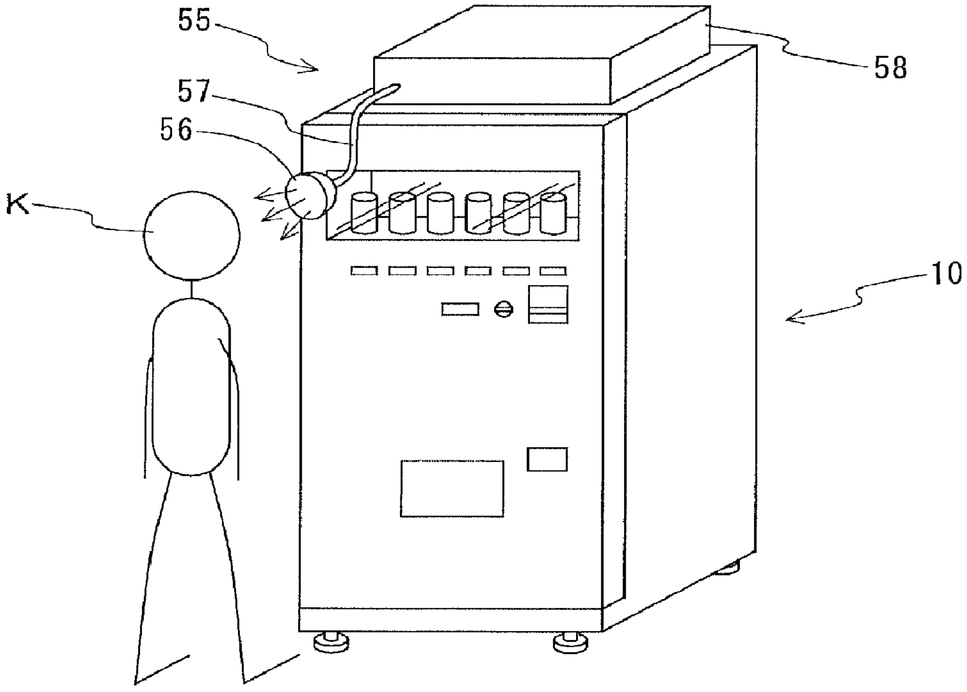
FIG. 16 is a perspective view illustrating an example of a gas supply unit.
Figure 17:
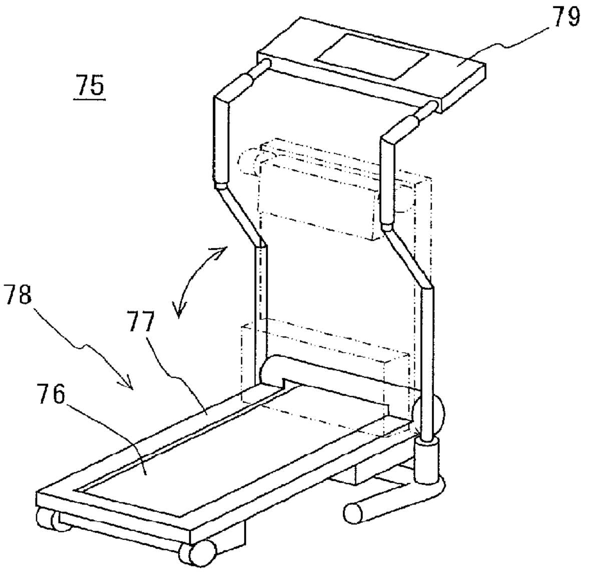
FIG. 17 is a perspective view illustrating an example of an exercise device.
Figure 18:
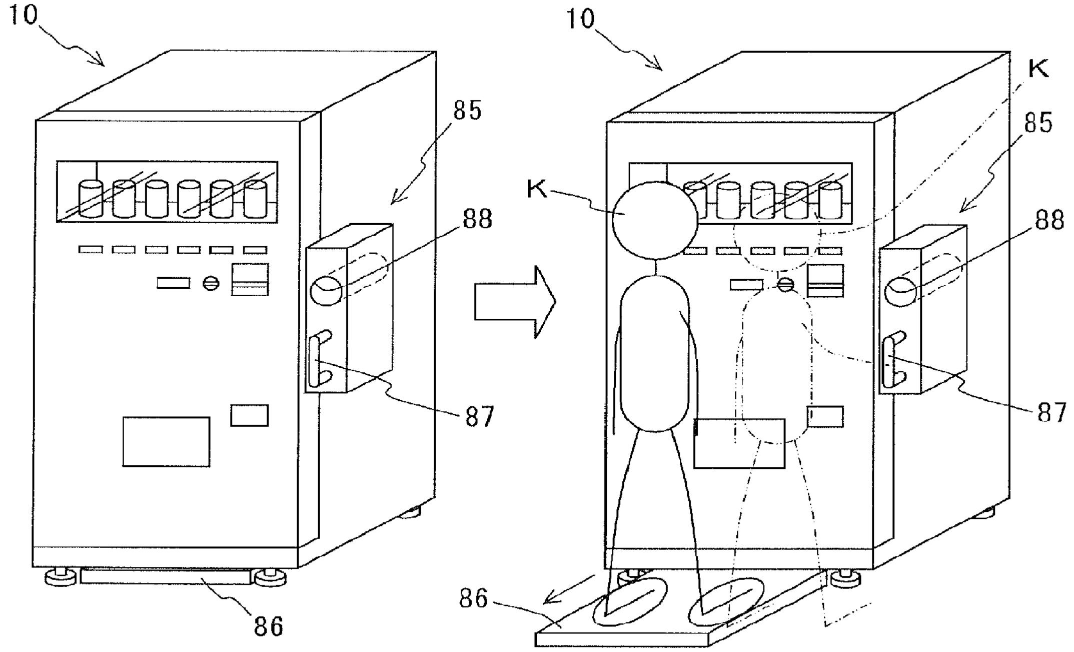
FIG. 18 is a perspective view illustrating an example of an examination device.
Figure 19:
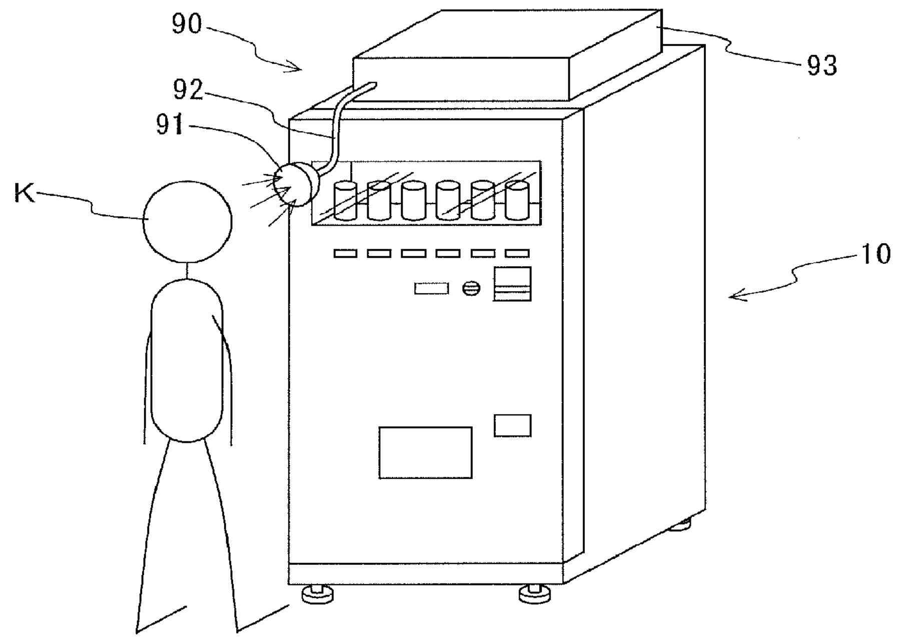
FIG. 19 is a perspective view illustration another example of the examination device.
Figure 20:
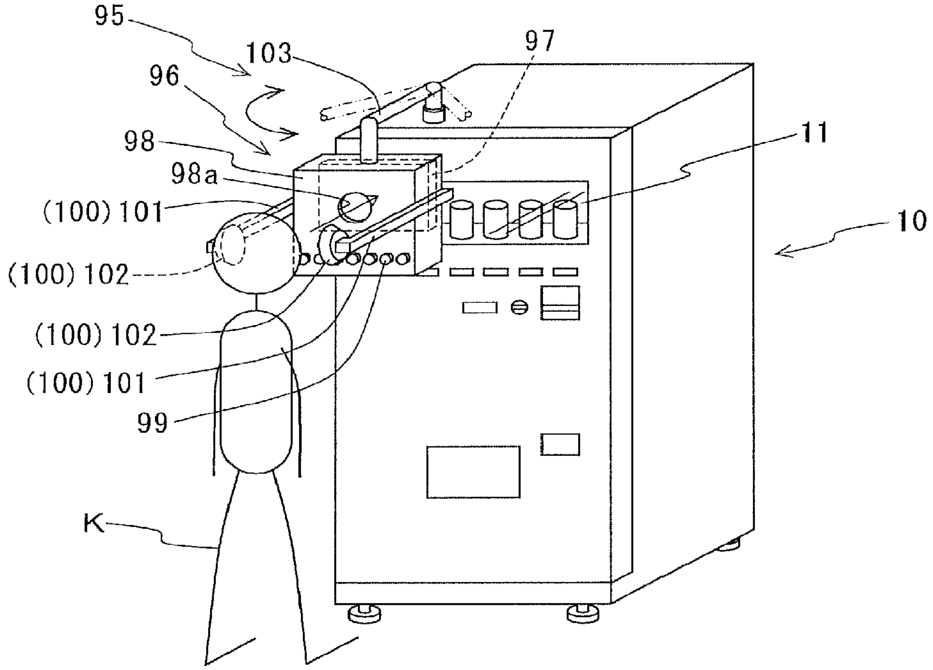
FIG. 20 is a perspective view illustrating an example of an indicating system and an audio output device.
Figure 21:
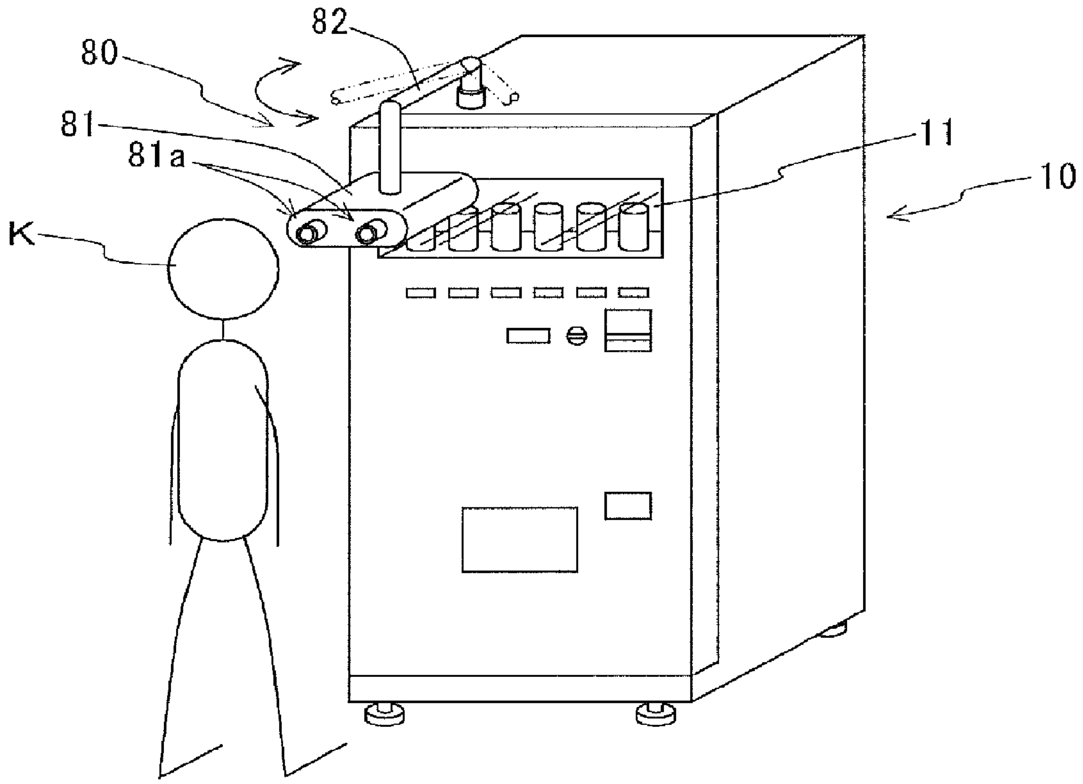
FIG. 21 is a perspective view illustrating another example of the indicating system.

Moreover, although the play device 20 has been explained in the foregoing as an example of devices connected to the vending machine main unit 10, for example, a massage device 50 as illustrated in FIG. 15, a gas supply unit 55 as illustrated in FIG. 16, a fitness machine (an exercise device) 75 as illustrated in FIG. 17, a health checkup device 85 as illustrated in FIG. 18, a mouth odor examination device 90 as illustrated in FIG. 19, an audiovisual device (indicating system and audio output device) 95 as illustrated in FIG. 20, and a visual recovery device (indicating system) 80 as illustrated in FIG. 21 can be connected to the vending machine main unit 10 in addition to the play device 20.

The massage device 50 illustrated in FIG. 15, which is configured with a base board 51 on which a purchaser K rides, with a backrest 52 mounted to the base board 51, and against which the purchaser leans, and with a (not-illustrated) massage mechanism built in the base board 51 and backrest 52 to massage the purchaser K, and whose actuation is controlled by the control means 17, massages the legs and back of the purchaser K. It should be understood that the massage device 50 may be configured to massage the shoulders, neck and total body of the purchaser K.

Moreover, the gas supply unit 55 illustrated in FIG. 16 is configured with a cup-shaped breathing member 56, with a connecting line 57, with a first end of which is connected to the breathing member 56, with a discharge mechanism, to which a second end of the connecting line 57 is connected, and whose actuation is controlled by the control means 17, for discharging a predetermined gas from the breathing member 56 to the outside. The discharge mechanism 58 is externally formed rectangular, and is disposed on the top face of the vending machine main unit 10. The breathing member 56 is disposed in front of the vending machine main unit 10.

Furthermore, the discharge mechanism 58 is configured to discharge an oxygen gas from the breathing member 56 to allow the purchaser K to breathe in and intake the oxygen gas, to discharge the air containing negative ion from the breathing member 56 to breathe in and intake the negative ion, or to discharge the air containing ingredients of a scent from the breathing member 56 to allow the purchaser K to inhale the scent. Breathing in oxygen gas is effective in improving metabolism and in prompting decomposition of lactic acid produced during exercise to attempt relieving fatigue, breathing in negative ion is effective in improving metabolism, and inhaling scent is effective in relaxing the purchaser K, like aromatherapy, as well as enjoying the scent.

It should be understood that the connecting line 57 may be configured so that a level at where the breathing member 56 is disposed can be adjusted, and the control means 17 may be configured to discharge from the discharge mechanism 58 the air containing ingredients of a scent the purchaser K has selected as appropriate, and the air containing ingredients of a scent associated with an item the purchaser K buys, or to give to the purchaser K a notice of ingredients of a scent associated with the item article the purchaser K has bought.

The exercise device 75 illustrated in FIG. 17 is provided with an operational mechanism 78 including a ring-like belt 76 on which the purchaser rides, with a housing 77 holding the belt 76 rotatably, and with a (not-illustrated) drive mechanism built in the housing 77, for rotating the belt 76 at a predetermined speed, and with an operation device 79 mounted to the housing 77, for controlling the actuation of a (not-illustrated) drive mechanism under the control pf the control means 17, and the exercise device 75 is configured to allow the purchaser to run and walk at a rotating speed of the belt 76. It should be understood that the exercise device 75 may be configured to be foldable so as to be leaned against, for example, a lateral side of the vending machine main unit 10 after folded.

Furthermore, the health checkup device 85 illustrated in FIG. 18 is provided with a weight assaying mechanism section 86 that measures weight and body fat percentage, a pulse assaying mechanism section 87 that measures pulse, a blood-pressure checking mechanism 88 that measures blood-pressure, and a (not-illustrated) output unit that displays on screen, and prints out, measurement results in the mechanisms 86, 87, 88, and is configured so that the weight assaying mechanism section 86 is provided on the under face of the vending machine main unit 10 to be able to be pulled out, and the pulse assaying mechanism section 87 and blood-pressure checking mechanism 88 are provided on a lateral side of the vending machine main unit 10. When the purchaser K rides on the weight measuring checking mechanism 86 pulled out to front of the vending machine main unit 10, the weight and body fat percentage of the purchaser K are measured, when the purchaser K grasps the pulse assaying mechanism section 87, pulse of the purchaser K is measured, and when the purchaser K inserts an arm into the hole in the blood-pressure checking mechanism 88, the blood-pressure of the purchaser K is measured.

It should be understood that the health checkup device 85 may be configured to judge fatigue level and physical condition from the obtained measurement result, and to display on screen, and print out, the judgment, not just to allow the (not-illustrated) output unit to display on screen, and to print out the measurement result in the mechanisms 86, 87, 88. Furthermore, the assaying mechanism sections 86, 87, 88 are controlled in activation by the control means 17. In addition, the weight assaying mechanism section 86 may be configured to be pulled out by hand toward front of the vending machine main unit 10, or configured to be pulled out by a drive unit as appropriate toward front of the vending machine main unit 10.

The mouth odor examination device 90 illustrated in FIG. 19 is provided with a cup-shaped breath introduction member 91, a connecting line 92, a first end of which is connected to the breath introduction member 91, and a mouth odor assaying mechanism section 93, to which a second end of the connecting line 92 is connected, and whose actuation is controlled by the control means 17 to measure the mouth odor. If the purchaser K breathes out into the breath introduction member 91, the exhaled breath is introduced from the breath introduction member 91 into the mouth odor assaying mechanism section 93, and mouth odor is measured by the mouth odor assaying mechanism section 93. Furthermore, the mouth odor assaying mechanism section 93 is externally formed rectangle, and disposed on the top face of the vending machine main unit 10. The breath introduction member 91 is disposed in front of the vending machine main unit 10. Moreover, the connecting line 92 may be configured so that a level at where the breath introduction member 91 is disposed can be adjusted. In addition, the mouth odor measurement device 90 may be configured to detect and measure alcohol contained in the breath.

The audiovisual device 95 illustrated in FIG. 20 is configured with a display mechanism section 96 including a display 97 on which a screen is indicated, an (not-illustrated) image reproducer 97 that indicates on the display 97 a screen of various images (for example, information such as fortune-telling, weather report, and news relating to current events, stock and currency exchange, scenery, animation, drama, movie and video game), and a rectangular accommodating member 98, in the center on the front face of which a peephole 98*a* is formed, and in which the display 97, (not-illustrated) image reproducer and a (not-illustrated) sound reproducing section to be described hereinafter are accommodated, with an audio output mechanism section 100 including two holding arms 101, first ends of which are connected to the lateral sides of the accommodating member 98, speakers 102 provided face to face to second ends of the holding arms 101 at an fixed interval from the ears of the purchaser K, for outputting speech and sound, and a (not-illustrated) sound reproducer that outputs from the speakers 102 various sounds (for example, relaxing music and the speech and sound corresponding to the images) under the control of the control means 17, with input buttons 99 provided on the front face of the accommodating member 98, for entering an input signal via the control means 17 to an (not-illustrated) image reproducer and to a (not-illustrated) audio reproducing section, and with a connecting arm 103, first end of which is anchored to the top face of the vending machine main unit 10 pivotally along the arrow. Following screens indicated on the display 97, the purchaser K pushes the input buttons 99 brought into correspondence with a desired image and sound to look through the peephole 98*a* at the images and to listen the sound with the speakers 102.

Furthermore, the accommodating member 98 is configured to be placed in a position where the display compartment 11 is not hiding behind the accommodating member 98 during the pivoting of the connecting arm 103, except when the purchaser K views the image, and listens the speech and sound, and to be moved to front of the vending machine main unit 10 by the purchaser K and a drive unit as appropriate, when the purchaser K views the image, and listens the sound. Moreover, the connecting arm 103 may be configured so that a level at where the accommodating member 98 is disposed can be adjusted. Additionally, the audiovisual device 95 may be configured to indicate or output the image and sound provided online. Alternatively, the display mechanism section 96 may be configured to operate a structure (for example, a doll) as appropriate to allow the purchaser K to look through the peephole 98*a* at the movement of the structure, not to play video on the display 97. Furthermore, a sound listing position, which is defined in front of the accommodating member 98, is a position where the purchaser K looks through the peephole 98*a* at the image, and listens the speech and sound with the speakers 102. In addition, the audio output mechanism section 100 may be provided with headphones disposed in front of the accommodating member 98 and speakers that directionally outputs sound toward the sound listening position, in place of the holding arms 101 and speakers 102, and be configured to allow only the purchaser K who is in the sound listening position to listen the speech and sound through the headphones and speakers.

With such an audiovisual device 95, only the purchaser K is allowed to view what is indicated (video and structure movement) because of the peephole 98*a*, and disposing the speakers 102 close to the ears of the purchaser K allows only the purchaser K to listen the speech and sound, to prevent the others from watching and listening, so that the value of the services for the purchases of the items is enhanced to increase the number of users, compared with an automatic vending machine provided with a display mechanism without the peephole 98*a* and an audio output mechanism section without the speakers 102. In addition, if what is provided by the audiovisual device 95 is fortune telling, an advantage of preventing other persons from watching and listening the fortune-telling pronouncement is obtained.

The visual recovery device 80 illustrated in FIG. 21 is provided with a display mechanism section 81 allowing the purchaser K to look through the peephole 81*a* at an image and object to be indicated and bringing them far away and closer (back and forth), and with a connecting arm 82, a first end of which is connected to the display mechanism section 81 to hold it, and a second end of which is mounted to the top face of the vending machine main unit 10 pivotally along the arrow. The purchaser K looks through the peephole 81*a* at the inside of the display mechanism section 81 to watch the image and object brought far away and closer. As a result, ciliary bodies that adjusts a focal point depending on the distance from the what is indicated is repeatedly constricted and relaxed so as to be trained to attempt restoring vision and relieving fatigue.

As just described, although in the automatic vending machine 1, 2, 5, 6 of this embodiment, the play device 20, massage device 50, gas supply unit 55, fitness machine 75, health checkup device 85, mouth odor examination device 90, audiovisual device 95 and visual recovery device 80 are connectable to the vending machine main unit 10, what is connected to the vending machine main unit 10 is preferably changed as appropriate, depending on where the automatic vending machine 1, 2, 5, 6 are placed and what is sold with them. If do so, the interest of purchasers is drown more strongly to lead to growth in sales of the items with the automatic vending machine 1, 2, 5, 6.

Furthermore, in order to connect a plurality of devices to the vending machine main unit 10, the same type of devices may be connected, and if a different type of devices, for example, play device 20, massage device 50, gas supply unit 55, fitness machine 75, health checkup device 85, mouth odor examination device 90, audiovisual device 95 and visual recovery device 80 are combined to be connected to the vending machine main unit 10, the interest of a wide range of purchasers is drawn, regardless of age and gender to further prompt use of the automatic vending machine 1, 2, 5, 6.

With regard to when the play device 20, massage device 50, gas supply unit 55, fitness machine 75, health checkup device 85, mouth odor examination device 90, audiovisual device 95 and visual recovery device 80 are actuated, they may be actuated at the same time with when the product dispensing mechanism 14 delivers the items, or may be actuated after a fixed period of time from when the items are delivered by the product dispensing mechanism 14.

Also feasible is a configuration in which the play device 20, massage device 50, gas supply unit 55, fitness machine 75, health checkup device 85, mouth odor examination device 90, audiovisual device 95 and visual recovery device 80 are provided with an actuation button as appropriate, and the control means 17 activates them after receiving an input signal from the actuation button. In such a configuration, the devices are activated after the purchaser is prepared for it, so that they are safely activated. Additionally, the devices' functions are employed fully from start to end.

Furthermore, the aspect of providing the play device 20, massage device 50, gas supply unit 55, fitness machine 75, health checkup device 85, mouth odor examination device 90, audiovisual device 95 and visual recovery device 80 is not limited to above examples, so they are provided integrally with, and separately from, the vending machine main unit 10.

As described above, the present invention is suitable to an automatic vending machine that can increase the number of users.

The embodiments and implementations that have been disclosed here are illustrative by nature are should not be regarded as limiting. The scope of the invention is defined by its claims rather than the foregoing description, and should be understood to include the features of the claims of the invention and equivalents thereof, in addition to all changes falling within the scope of the claims.

The invention claimed is:

1. An automatic vending machine comprising:

a vending machine main unit provided with a product dispensing mechanism for delivering an item previously stored interiorly to an outside, one of a massage device furnished with a massage mechanism section and an exercise device provided with an actuation mechanism section, and a control means for controlling operation of the vending machine main unit and one of the massage device and the exercise device, the vending machine main unit and one of the massage device and the exercise device being interconnected via said control means, wherein said vending machine main unit is provided with a payment accepting mechanism for accepting payment for the product; and wherein said control means is configured so as to check, based on the payment accepted by said payment accepting mechanism, whether the accepted payment is equivalent to a value for the product, and when having determined acceptance of payment equivalent to the value of the product, to activate said product dispensing mechanism to discharge the product exteriorly, and meanwhile activate one of said massage mechanism section and said actuation mechanism section, and one of the massage device and the exercise device are provided with an actuation button, and the control means activates one of the massage device and the exercise device after receiving an input signal from the actuation button.

2. An automatic vending machine comprising:

a vending machine main provided with a product dispensing mechanism for delivering an item previously stored interiorly to an outside, one of a massage device furnished with a massage mechanism section and an exercise device provided with an actuation mechanism section, and a control means for controlling operation of the vending machine main unit and one of the massage device and the exercise device, the vending machine main unit and one of the massage device and the exercise device being interconnected via the control means, wherein one of said massage device and said exercise device is provided with a payment accepting mechanism for accepting payment for the product; and wherein said control means is configured so as to check, based on the payment accepted by said payment accepting mechanism, whether the accepted payment is equivalent to a value for the product and, when having determined acceptance of payment equivalent to the value of the product, to activate said product dispensing mechanism to discharge the product exteriorly, and meanwhile activate one of said massage mechanism section and said actuation mechanism section, and one of the massage device and the exercise device are provided with an actuation button, and the control means activates one of the massage device and the exercise device after receiving an input signal from the actuation button.

* * * * *